United States Patent Office 3,273,401
Patented Sept. 20, 1966

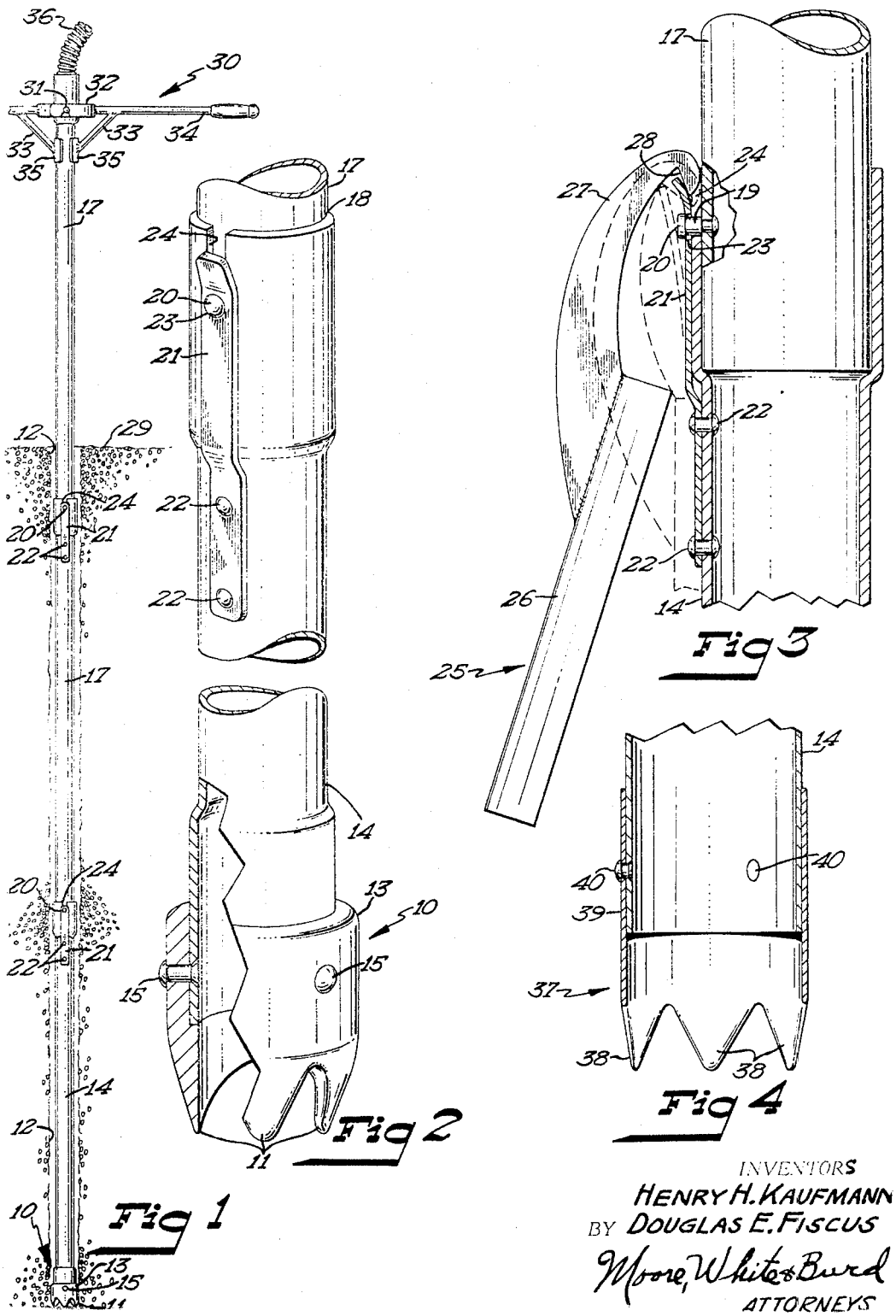

3,273,401
PROBE SAMPLER
Henry H. Kaufmann, St. Louis Park, and Douglas E. Fiscus, Burnsville, Minn., assignors to Cargill, Incorporated, Minneapolis, Minn., a corporation of Delaware
Filed May 14, 1964, Ser. No. 367,432
8 Claims. (Cl. 73—421)

The present invention relates to a method and means for sampling cotton seed. Specifically, it is a method of improved sampling of cotton seed in trucks or other similar shallow containers and for also sampling in storage sheds or bins where no practical means eixsted before.

It is desirable to sample cotton seed when stored in large shed-like bins or while in trucks before being placed in storage or use. Cotton seed is very resistant to flow, however, and sampling techniques used with flowing materials cannot be used with cotton seed. It has an angle of repose approaching 90°. In the past, samples of cotton seed were collected by twisting a coil into the mass by hand or with a power drive. The coil was then extracted and the seed removed. There are problems inherent in the use of the coil.

The coil method consists of using a coil similar to a coil spring which is twisted into a mass of stored cotton seed. This type of sampling, when done normally, take two mean 5 to 10 minutes just to take a sample to a 2 to 4 foot depth. After the coil has been removed from the mass, the cotton seed has to be cleared out of the coil and placed in a container to go to the laboratory for testing. This manual coil method has serious limitations even for use in trucks, because depth of cotton seed in the trunk bed about 9 feet and samples can be taken only to a depth of about 4 feet, at the most 5 feet. If a hole for the operator is dug as with a shovel, the entire contents of the truck can be sampled but the time involved becomes very great.

Power has been used for sampling cotton seed in trucks by use of the coil. These power driven coils remove cotton seed samples to greater depth, but are slow to use compared with the present invention and their use is fraught with hazards. The walls of trucks such as are used for transporting cotton seed are subject to considerable stresses due to the weight of the cotton seed. It is common, therefore, to brace these walls by interconnecting them with chains or cables. The danger in using a power auger is that the side support braces have often been engaged in removing samples of cotton seed. Injury to the trucks is certain and to the operators likely when the coil becomes entangled with the braces either when driving the spring or as it is removed.

Since the usual cotton seed storage bins involve depths of up to 70 feet, no sampling other than surface sampling has previously been available for these installations.

The present invention solves these problems by providing a pneumatic sample collecting probe which one man can operate and take a sample out of a truck to its total depth, usually about 9 feet, in about 1 minute. There is no necessity of stopping to clear the probe as is done with the coil, because the cotton seeds are drawn off by a vacuum in the probe tube and placed at once in sample containers. Because one man operates this probe and since his power is necessarily limited the danger of breaking the side support braces of the trucks is greatly reduced, in fact, substantially eliminated. When sampling storage sheds or bins, the time involved is greated but, nevertheless, samples can be taken to the total depth of the bin.

It is therefore an object of this invention to provide an improved cotton seed sampling method and probe.

It is another object of this invention to provide a cotton seed sampling method and means for sampling seed in storage bins.

It is another object of this invention to provide a cotton seed sampling probe which may be easily operated by one man.

A still further object of this invention is to provide a cotton seed sampling method and probe which delivers the sample into a container.

A yet further object of this invention is to provide a cotton seed sampling method of sampling cotton seed which includes packing the stored cotton seed into a more or less solid mass about the probe point as it penetrates so as to form a firm air channel or duct surrounding the probe tube.

A yet still further object of this invention is to provide a cotton seed sampling probe comprised of a toothed truncated conical hollow tip secured to a hollow tube shaft of smaller diameter than the tip whereby the tip forms a stable channel larger than the tube.

It is yet another object of this invention to provide a pneumatic probe including a jointed tube having minimal obstructions internally thereof, means to secure the sections of tube together including a spring catch and means for actuating said spring catch quickly and efficiently while deflecting the spring only within its elastic limits.

Still another object of this invention is to provide a structure for sampling cotton seed in a quicker and therefore less expensive and also less dangerous manner than heretofore.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the priciples of the invention may be employed.

The invention is illustrated by the accompanying drawings in which the same numerals refer to corresponding parts and in which:

FIGURE 1 is a side elevation of the cotton seed sampling probe being inserted into a mass of stored cotton seed;

FIGURE 2 is a fragmentary, enlarged perspective view of portions of the probe with portions broken away to show internal construction;

FIGURE 3 is a partial vertical section partial side elevation view of the joint, retaining means and release means drawn to a larger scale than FIGURE 2; broken lines depicting an adjusted position of parts; and FIGURE 4 is a vertical section of a modified tip drawn to a scale between those of FIGURES 1 and 2.

In FIGURES 1 through 3 the hollow tip 10 comprises a plurality of teeth 11 forming the point of said tip. The teeth 11 form a truncated cone and as the probe is pressed further into the storage area the cotton seed surrounding the probe is forced, by being wedged outward, into a stable air duct 12. The body 13 of said tip is rigidly secured to the hollow tube shaft 14 by any appropriate means such as is shown by the rivets 15. The body 13 must be of a greater diameter than the hollow tube shaft 14. For example, the body 13 is at least ½ inch and preferably ⅝ inch larger in diameter than said hollow tube shaft 14.

It is important that there be as few obstructions inside the hollow tube shaft 14 as possible, because cotton seeds have a tacky nature. Any roughness or obstructions in the tube creates the probability of the cotton seed samples "hanging up" or becoming caught in the hollow tube shaft 14 during their removal from the storage mass.

Extension hollow tubes such as the ones identified by number 17 are removably secured to hollow tube shaft 14 by any suitable substantially airtight means such as a telescopic joint 18. The extension hollow tube is of the same diameter as the hollow tube shaft 14. The telescopic joint 18 is retained by any suitable means such as by providing the male member of said joint with a pin 19 and the female joint member with the spring 21. The pin 19 should have some means on its end, such as the head 20, of slightly increased diameter from the shank of said pin 19 so that spring 21 is not easily dislodged therefrom accidentally. Spring 21 is rigidly secured at one of its ends to the exterior of the female joint member in any appropriate way that causes a minimum of construction to be within the hollow tube shaft 14 or extension hollow tubes 17. An example of such fastening would be the use of the rivets 22. At the free end of the spring 21 is a hole 23 of approximately the same diameter as the pin head 20. A longitudinal slot 24, of a width the same as the diameter of the pin 19 is provided in the female joint member. To join the hollow shaft member 14 with the extension hollow tube member 17, the end of hollow tube member 17 is inserted into the end of hollow tube shaft 14 in such a manner that the pin 19 slides into the longitudinal slot 24 and aligned with the hole 23 of the spring 21. The spring 21 will snap into engagement with the pin head 20 thus retaining hollow tube extension 17 to the hollow tube shaft 14.

When it is desired to reduce the length of the probe, one only has to lift the spring 21 off of the pin head 20 and pull the hollow tube extension 12 away from the hollow tube shaft 14. The spring 21 may be lifted away from the pin head 20 by any means which will not cause it to be stressed beyond its elastic limits. A certain means of releasing the spring 21 without exceeding its elastic limit is by the use of a spring release lever 25 as shown in FIGURE 3.

The spring release lever is comprised of handle 26 which is a hollow tube section of similar diameter to the hollow tube shaft 14 which is rigidly secured to a hook 27 by any appropriate means, for example, welding. To release the extension hollow tube member 17 by use of the spring release lever 25, the tip 28 of the hook 27 is inserted between the spring 21 and the hollow tube extension 17 as is shown in FIGURE 3. The handle 26 is then brought into contact with the hollow tube shaft member 14. Thus, the free end of the spring 21 is raised and is taken out of engagement with the pin head 20 as is shown by the dotted lines in FIGURE 3 but the extent of flexing of the spring is limited by engagement of handle 26 and tubes 14 and 17 as the case may be. The hollow tube extension 17 is then free to be withdrawn from the hollow tube shaft 14. Tubes 14 and 17 may be of any desired length but a most suitable one has been found to be 4 feet.

FIGURE 1 shows the cotton seed sample collecting probe as it is inserted into a mass of stored cotton seed 29. The probe is inserted into the cotton seed 29 by means of a handle assembly 30. The handle assembly 30 is comprised of two handle pieces 34 pivoted together by means of pins 31 at a yoke 32 which surrounds a probe tube. Arms 33 extend from the handles 34 to clamping members 35. Clamping members 35 are of semicylindrical hollow tube sections of a similar diameter to the hollow tube shaft members 14 and 17. Handles 34, when pushed down as shown in FIGURE 1, force the clamping members to grip and move the probe tubes in a longitudinal direction. As one motion of handles 34 clamp the probe tubes and reverse motion releases them, the assembly 30 must be reversed for removing the probe.

A vacuum tube 36 is removably secured in substantially airtight relation to the end of the cotton seed sample collecting probe by any suitable conventional means (not shown). Flexible tube 36 leads to a conventional suitable source of vacuum (not shown) including a separator such as a conventional cyclone.

FIGURE 4 shows a variation of the cotton seed sample collecting probe as would be used for taking samples from a truck. The point 37 has teeth 38 and a body 39. The tip 37 is rigidly secured to the hollow tube shaft member 14 by any appropriate means such as the rivets 40 as is shown in FIGURE 4. The body 39 of tip 37 is of slightly larger diameter than the hollow tube shaft 14. In this case where the maximum depth reached by the truck probe is about 11 feet, the difference in size between the head and tube does not have to meet the minimum requirements noted for the bin probe. Also, it is constructed from a single piece of tubing.

*Operation*

To collect a sample of cotton seed, the operator first places the handle 30 over the end of the hollow tube shaft 14 in such a manner that force may be transmitted downward. He then connects the vacuum tube 36 to the end of hollow tube shaft 14. The operator then forces, by means of the handle 30, the tip 11 into the stored cotton mass 29 with a twisting motion. Cotton seed is either drawn into the tube 14 or forced by the conical portion outward into a fairly solid cylinder wall about the probe tip 11, forming the air duct 12. As the probe is inserted deeper and deeper into the cotton seed mass 29 the hollow tube shaft 14, because of its smaller diameter than that of the tip body 13, has very little if any contact with the cotton seed mass 29. This minimum contact causes a minimum of friction between the probe and the cotton seed mass 29 thus making it possible to force the probe to depths such as those encountered in storage bins which would not be true if the diameter of the hollow tube shaft 14 were the same as that of the tip body 13. Not only does the air duct 12 minimize friction, it also allows atmospheric air to flow readily to tip 10 without the need for a separate air duct as part of the probe.

Also, it was discovered through sad experience that failure to provide clearance between tubes 14 and 17 on the one hand and cotton seed 29 on the other could produce another problem. With a close fit, cotton seed were caught between the end of spring 21 and the adjacent tube. Continuous wedging by increasing numbers of seed at this point actually released the spring with sufficient frequency to be regarded as a serious problem commercially. Even the relatively slight clearance provided by the tip 10 has terminated this difficulty.

As the tip 11 is inserted into the cotton seed mass 29, the teeth 12 tend to separate, with a minimum of damage, a sample of seeds from the mass. The vacuum within the hollow tube shaft 14 allows the cotton seed to be driven, by the greater air pressure in the shaft surrounding the probe, up tube 14 and via tube 36 to sample containers.

When the probe has been inserted as far as the length of hollow tube shaft 14 will allow, the vacuum tube 36 is removed from the probe end, as is the handle assembly 30. The first extension hollow tube member 17 is then inserted into the end of the hollow tube shaft 14 in such a manner that the pin 19 lines up with the longitudinal slot in hollow tube shaft 14. When the extension hollow tube 17 is pushed down on the hollow tube shaft 14 the pin 19 slides under spring 21 and lifts it until the hole 23 in the spring 21 engages the pin head 20, thus holding tightly together the extension hollow tube 17 and the hollow tube shaft 14. Handle assembly 30 is then placed on the extension hollow tube 17 in such a manner that force will be transmitted in a downward direction. Vacuum tube 36 may then be secured to the end of the extension hollow tube 17. Any number of extension hollow tube sections 17 may be secured to the probe so as to give an effective sampling depth which covers a wide range.

After the sample is taken and the probe is to be withdrawn, the vacuum tube 36 is first removed from the extension hollow tube 17. Handle assembly 30 is removed and inverted so that force is transmitted in an upward direction. The probe is then withdrawn until the uppermost joint is above the mass of cotton seed 29 at which time the spring release lever is hooked onto the spring 21 and its handle 26 is depressed in such a manner as to lift the spring away from the pin head 20, as shown in broken lines in FIGURE 3, at which time the extension hollow tube 17 may be separated from the hollow tube shaft member 14.

When the truck probe of FIGURE 4 is used, a combined reciprocating and oscillating motion is used to drive the probe into the seed. As a result a larger opening is formed in the seed than would be true if the probe were forced straight into the seed. This provides the necessary air and antifriction channel for the truck probe. The shallowness of the truck beds, compared to bins, does not require as much of an air channel either as a considerable amount of air filters through the seed to these depths.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A cotton seed sample collecting device comprising: a hollow probe means for packing cotton seed into a solid duct about and spaced from said probe, means for isolating cotton seeds from the mass, means for collecting cotton seeds isolated from the solid mass of stored cotton seed, means for conveying said collected cotton seed to a sample container, means for inserting and removing said probe into a mass of cotton seed.

2. The cotton seed sample collecting device of claim 1 further characterized by the means for packing the cotton seed to be sampled into a solid mass about and spaced from the sampling probe comprising a truncated conical tip which, when inserted into said cotton seed mass, wedges and packs the cotton seed outward into a semisolid duct wall.

3. The cotton seed sample collecting device of claim 1 further characterized by the means for separating individual cotton seeds isolated from the mass of stored cotton seed comprising a plurality of teeth forming the aforementioned truncated conical tip, said tip being hollow with an opening truncating the conical point thereof.

4. A cotton seed sample collecting device of claim 5 further characterized by the means for conveying sa: collected cotton seeds to a sample container comprisir a hollow tube shaft of smaller diameter than and s cured to said pointed tip and means for connecting sai hollow tube shaft to a source of vacuum.

5. The cotton seed sample collecting device of claim further characterized by the diameter of said tip bein at least ½ inch greater in diameter than said hollow tut shaft diameter.

6. The cotton seed sample collecting device of claim further characterized by the means for inserting and r moving said cotton seed sample collecting device int the storage container comprising a removable hand] which has no part thereof within said hollow tube shaf 7. The structure of claim 1 in which said tube con prises a series of sections telescopically jointed togethe said joints comprising, enlarging one tube for a distanc to receive the other tube, a pin secured to the outside c one of said tubes, a leaf spring secured to the outsid of said tubes, said leaf spring having a free end neare: the end of the tube to which it is secured, said leaf sprin having a hole therein that embraces said pin when sai tubes are telescopically fitted together with said pin an leaf spring aligned.

8. The structure of claim 7 in which said spring i secured to the enlarged, female portion of said joint an said enlarged, female portion has a slot therein extendin from the edge thereof to a point directly below said hol in said leaf spring and said pin is headed.

References Cited by the Examiner

UNITED STATES PATENTS

| | | | |
|---|---|---|---|
| 2,167,393 | 7/1939 | Muncy | 73—421 |
| 2,771,776 | 11/1956 | Haven | 73—42 |
| 3,153,344 | 10/1964 | Lawrence et al. | 73—425 |

FOREIGN PATENTS 151,932   7/1953   Australia.

LOUIS R. PRINCE, *Primary Examiner.*

S. C. SWISHER, *Assistant Examiner.*